(12) United States Patent
Sun et al.

(10) Patent No.: US 11,703,146 B2
(45) Date of Patent: Jul. 18, 2023

(54) CONTROL VALVES AND CAGES THAT ARE ADAPTED TO REDUCE FLASHING AND CAVITATION

(71) Applicant: EMERSON PROCESS MANAGEMENT (TIANJIN) VALVES CO., LTD., Tianjin (CN)

(72) Inventors: Zhimin Sun, Tianjin (CN); Zhengyu Chen, Tianjin (CN)

(73) Assignee: EMERSON PROCESS MANAGEMENT (TIANJIN) VALVES CO., LTD., Tianjin (CN)

( * ) Notice: Subject to any disclaimer, the term of this patent is extended or adjusted under 35 U.S.C. 154(b) by 507 days.

(21) Appl. No.: 16/530,802

(22) Filed: Aug. 2, 2019

(65) Prior Publication Data

US 2020/0041036 A1 Feb. 6, 2020

(30) Foreign Application Priority Data

Aug. 3, 2018 (CN) .......................... 201810876230.2
Aug. 3, 2018 (CN) .......................... 201821244835.1

(51) Int. Cl.
*F16K 47/08* (2006.01)
*F16L 55/05* (2006.01)
(Continued)

(52) U.S. Cl.
CPC .............. *F16K 47/08* (2013.01); *F16L 55/04* (2013.01); *F16L 55/05* (2013.01); *F16L 55/055* (2013.01);
(Continued)

(58) Field of Classification Search
CPC .... F16K 3/0245; F16K 47/08; F16L 155/033; F16L 155/05; F16L 155/055; Y10T 137/86791; Y10T 137/86212
(Continued)

(56) References Cited

U.S. PATENT DOCUMENTS 352,273 A 11/1886 Solano
3,954,124 A * 5/1976 Self .......................... F16K 3/34
138/42

(Continued)

FOREIGN PATENT DOCUMENTS

CN 1306608 A 8/2001
CN 202834094 U 3/2013
(Continued)

OTHER PUBLICATIONS

International Search Report and Written Opinion for PCT/CN2019/098993, dated Oct. 28, 2019.

*Primary Examiner* — Matthew W Jellett
(74) *Attorney, Agent, or Firm* — Marshall, Gerstein & Borun LLP (57) ABSTRACT

Control valves and cages that are adapted to reduce flashing and cavitation. A cage for use with a control valve having an inlet, an outlet, and defining a flow passage between the inlet and the outlet. The cage includes a generally cylindrical body and having a central bore, an upper portion, and a lower portion and an inner wall, an outer wall, and an intermediate wall disposed between the inner wall and the outer wall. The inner wall includes an inlet opening and the outer wall including an outlet opening. The inner wall, the outer wall, and the intermediate wall cooperate to define a portion of the flow passage that extends from the inlet opening, through the cage along the inner wall, along the intermediate wall, past a terminal portion of the intermediate wall, along the outer wall, to the outlet opening.

22 Claims, 11 Drawing Sheets

(51) Int. Cl.
*F16L 55/055* (2006.01)
*F16L 55/04* (2006.01)

(52) U.S. Cl.
CPC ............... *Y10T 137/86212* (2015.04); *Y10T 137/86791* (2015.04)

(58) Field of Classification Search
USPC .......................................................... 251/127
See application file for complete search history.

(56) References Cited

U.S. PATENT DOCUMENTS

| | | | | |
|---|---|---|---|---|
| 4,326,554 | A * | 4/1982 | Gongwer | F16K 25/04 137/14 |
| 4,367,807 | A * | 1/1983 | Fink | B25D 17/12 181/230 |
| 4,617,963 | A * | 10/1986 | Stares | F16K 47/08 137/625.3 |
| 5,803,119 | A | 9/1998 | Steinke | |
| 6,244,297 | B1 * | 6/2001 | Baumann | F16K 47/08 137/625.3 |
| 6,394,134 | B1 * | 5/2002 | Kwon | F16K 47/08 137/625.3 |
| 9,494,174 | B2 * | 11/2016 | Pastecki | F23R 3/28 |
| 9,556,970 | B2 * | 1/2017 | Mastrovito | F16K 47/12 |
| 9,759,347 | B2 * | 9/2017 | Elliott | F16K 47/08 |
| 10,443,759 | B2 * | 10/2019 | McCarty | F16K 3/24 |
| 10,697,561 | B2 * | 6/2020 | McCarty | F16K 1/52 |
| 2015/0020903 | A1 | 1/2015 | Mastrovito et al. | |

FOREIGN PATENT DOCUMENTS

| | | |
|---|---|---|
| CN | 202868037 U | 4/2013 |
| CN | 104006170 A | 8/2014 |
| CN | 104295752 A | 1/2015 |

* cited by examiner

CONTROL VALVES AND CAGES THAT ARE ADAPTED TO REDUCE FLASHING AND CAVITATION

FIELD OF THE DISCLOSURE

The present patent relates generally to control valves and cages and, in particular, to control valves and cages that are adapted to reduce flashing and cavitation.

BACKGROUND

Fluid may flow through a flow path of a control valve between an inlet and an outlet. As the fluid flows through a restricted area of the control valve, the phase of the fluid may change. When the pressure of the fluid drops to or below a vapor pressure of the fluid, vapor cavities may form in the fluid. When the downstream pressure of the fluid is higher than the vapor pressure, the vapor cavities may collapse in an event referred to as cavitation. When the downstream pressure of the fluid stays at or below the vapor pressure, the vapor cavities may expand in an event referred to as flashing. Flashing and cavitation may damage components of the control valve. Additionally, flashing and cavitation may increase the noise and vibration generated when operating the control valve.

SUMMARY

In accordance with a first example, a control valve includes a valve body having an inlet, an outlet, and defining a flow passage between the inlet and the outlet. The control valve includes an orifice disposed in the flow passage and has a valve seat. The control valve includes a generally cylindrical cage disposed within the valve body having a central bore, an upper portion, and a lower portion. The lower portion is seated against the valve seat. The control valve includes a control element slidably received in the central bore of the cage that is shiftable between a closed position in which the control element is seated against the valve seat thereby preventing flow though the orifice, and an open position in which the control element is spaced away from the valve seat thereby permitting flow through the orifice. The cage includes an inner wall, an outer wall, and an intermediate wall disposed between the inner wall and the outer wall. The inner wall and the outer wall extend from the upper portion of the cage. The intermediate wall extends from the lower portion of the cage. The inner wall includes an inlet opening and the outer wall including an outlet opening. The inner wall, the outer wall, and the intermediate wall cooperate to define a portion of the flow passage. The portion of the flow passage extends from the inlet opening to the outlet opening. The portion of the flow passage extends from the inlet opening, between the inner wall and the intermediate wall, past a terminal portion of the intermediate wall, between the intermediate wall and the outer wall, to the outlet opening.

In accordance with a second example, a cage for use with a control valve having an inlet, an outlet, and defining a flow passage between the inlet and the outlet, includes a generally cylindrical body having a central bore, an upper portion, and a lower portion. The cage further includes an inner wall, an outer wall, and an intermediate wall disposed between the inner wall and the outer wall. The inner wall includes an inlet opening and the outer wall includes an outlet opening. The inner wall, the outer wall, and the intermediate wall cooperate to define a portion of the flow passage. The portion of the flow passage extends from the inlet opening to the outlet opening. The portion of the flow passage further extends from the inlet opening, through the cage along the inner wall, along the intermediate wall, past a terminal portion of the intermediate wall, along the outer wall, to the outlet opening.

In further accordance with the foregoing first and/or second examples, an apparatus may further include any one or more of the following:

In accordance with one example, at least one of the inner wall and the outer wall includes a plurality of protrusions extending into the portion of the flow passage and the intermediate wall includes a plurality of protrusions extending into the portion of the flow passage.

In accordance with another example, the protrusions cooperate to form a plurality of pressure drops along the portion of the flow passage.

In accordance with another example, the plurality of protrusions carried by the at least one of the inner wall and the outer wall are vertically offset from the plurality of protrusions carried by the intermediate wall.

In accordance with another example, a first pair of the protrusions and a second pair of the protrusions are vertically spaced by a substantially equal distance.

In accordance with another example, the plurality of protrusions carried by the at least one of the inner wall and the outer wall overlap the plurality of protrusions carried by the intermediate wall.

In accordance with another example, the outer wall, the inner wall, and the intermediate wall are substantially parallel to one another.

In accordance with another example, the upper portion of the cage is coupled to the lower portion of the cage.

In accordance with another example, the upper portion of the cage is coupled to the lower portion of the cage via at least one of threads or a fastener.

In accordance with another example, the intermediate wall is disposed at an angle relative to a longitudinal axis of the control valve.

In accordance with another example, a first pair of the protrusions are vertically spaced a first distance apart, and a second pair of the protrusions are vertically spaced a second distance apart, the second distance being different from the first distance.

In accordance with another example, the plurality of protrusions carried by the at least one of the inner wall and the outer wall are different lengths and the plurality of protrusions carried by the intermediate wall are different lengths.

In accordance with another example, further including a divider. The divider couples the inner wall and the intermediate wall.

In accordance with another example, further including a plurality of dividers. The dividers couple the inner wall and the intermediate wall and separate the inlet opening into a plurality of inlet-sub openings.

In accordance with another example, ends of the inlet-sub openings are vertically off set.

In accordance with another example, the inner wall includes a plurality of radially outwardly extending protrusions and the outer wall includes a plurality of radially inwardly extending protrusions. The intermediate wall includes a plurality of radially inwardly extending protrusions and a plurality of radially outwardly extending protrusions.

In accordance with another example, the radially outwardly extending protrusions of the intermediate wall are a different length than the radially inwardly extending protrusions of the intermediate wall.

In accordance with another example, the radially inwardly extending protrusions of the inner wall are a different length than the radially outwardly extending protrusions of the outer wall.

In accordance with another example, the intermediate wall is angled relative to at least one of the inner wall and the outer wall.

In accordance with another example, portions of the plurality of protrusions carried by the inner wall are angled relative to at least one of the inner wall and portions of the outer wall and the plurality of protrusions carried by the intermediate wall are angled relative to at least one of the inner wall and the outer wall.

In accordance with another example, the inner wall and the outer wall extend from the upper portion of the cage and the intermediate wall extends from the lower portion of the cage.

In accordance with another example, further including an outer intermediate wall. The outer intermediate wall extends from the upper portion of the cage. The portion of the flow passage further extends from the inlet opening, between the inner wall and the intermediate wall, past a terminal portion of the intermediate wall, between the intermediate wall and the outer intermediate wall, past a terminal portion of the outer intermediate wall, between the outer intermediate wall and the outer wall, to the outlet opening.

In accordance with another example, the inner wall extends from the upper portion of the cage and the intermediate wall and the outer wall extend from the lower portion of the cage.

In accordance with another example, further including a second intermediate wall and a third intermediate wall, the second intermediate wall extends from the upper portion of the cage and the third intermediate wall extends from the lower portion of the cage.

In accordance with another example, further including a second intermediate wall and a third intermediate wall. The inner wall, the second intermediate wall, and the outer wall extend from the upper portion of the cage. The intermediate wall and the third intermediate wall extend from the lower portion of the cage. The portion of the flow passage further extends from the inlet opening, between the inner wall and the intermediate wall, past a terminal portion of the intermediate wall, between the intermediate wall and the second intermediate wall, past a terminal portion of the second intermediate wall, between the second intermediate wall and the third intermediate wall, past a terminal portion of the third intermediate wall, between the third intermediate wall and the outer wall, to the outlet opening.

In accordance with another example, at least one of the inner wall and the outer wall includes a plurality of protrusions extending into the portion of the flow passage and the intermediate wall includes a plurality of protrusions extending into the portion of the flow passage.

DETAILED DESCRIPTION

Although the following text discloses a detailed description of example methods, apparatus and/or articles of manufacture, it should be understood that the legal scope of the property right is defined by the words of the claims set forth at the end of this patent. Accordingly, the following detailed description is to be construed as examples only and does not describe every possible example, as describing every possible example would be impractical, if not impossible. Numerous alternative examples could be implemented, using either current technology or technology developed after the filing date of this patent. It is envisioned that such alternative examples would still fall within the scope of the claims.

Figure 1:
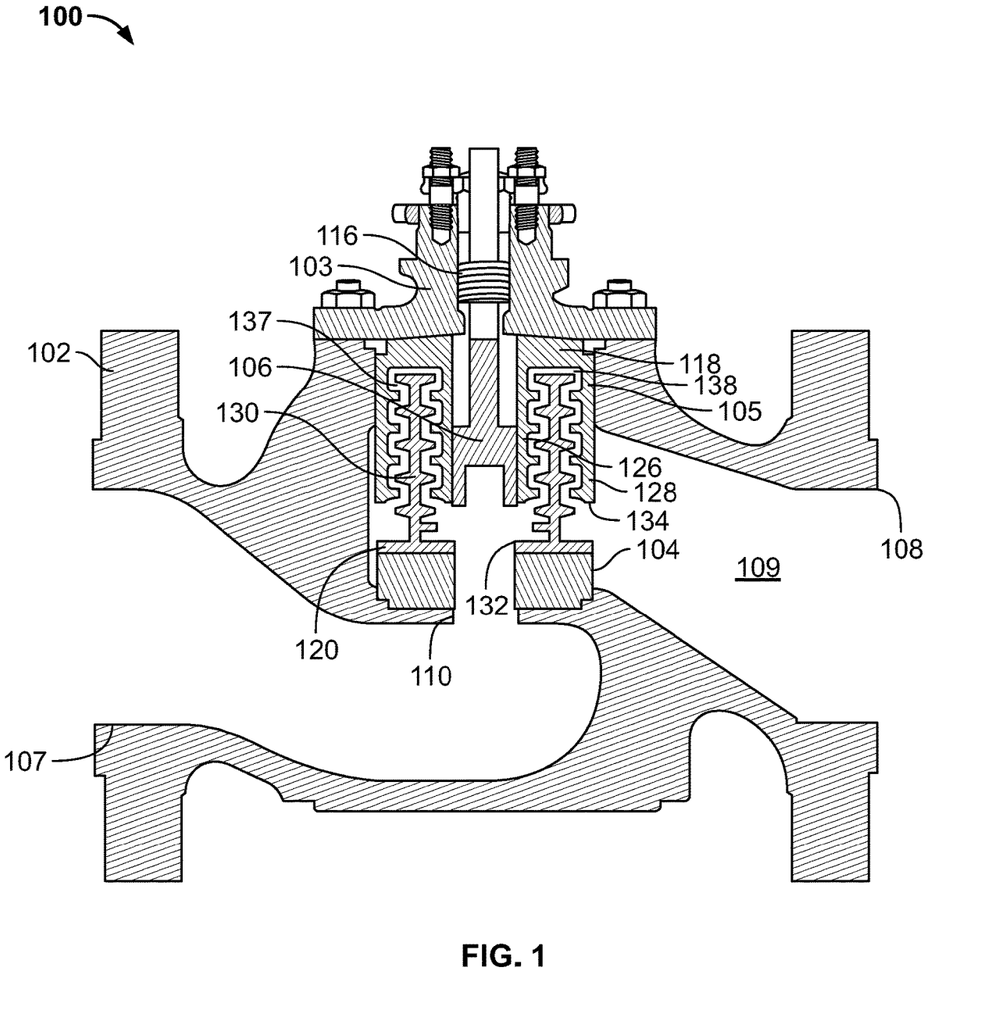
FIG. 1 illustrates a control valve assembled in accordance with a first disclosed example of the present invention.

Referring now to the drawings, FIG. 1 illustrates a control valve 100 assembled in accordance with a first disclosed example of the present invention. In accordance with the disclosed example, the control valve 100 includes a valve body 102, a bonnet 103, a valve seat 104, a generally cylindrical cage 105, and a control element 106.

The valve body 102 has an inlet 107, an outlet 108, and defines a flow passage 109 between the inlet 107 and the outlet 108. The valve body 102 also includes an orifice 110 disposed in the flow passage. The valve seat 104 is positioned immediately adjacent the orifice 110.

The bonnet 103 is coupled to the valve body 102. The bonnet 103 retains the valve seat 104 and the cage 105 within the valve body 102.

The cage 105 is disposed within the valve body 102 and has a central bore 116, an upper portion 118, and a lower portion 120. The lower portion 120 of the cage 105 is seated against the valve seat 104.

The control element 106 is slidably received within the central bore 116 of the cage 105. The control element 106 is shiftable between a closed position in which the control element 106 is seated against the valve seat 104 to prevent fluid flow through the orifice 110 and an open position in which the control element 106 is spaced away from the valve seat 104 to permit fluid flow through the orifice 110.

Figure 10:
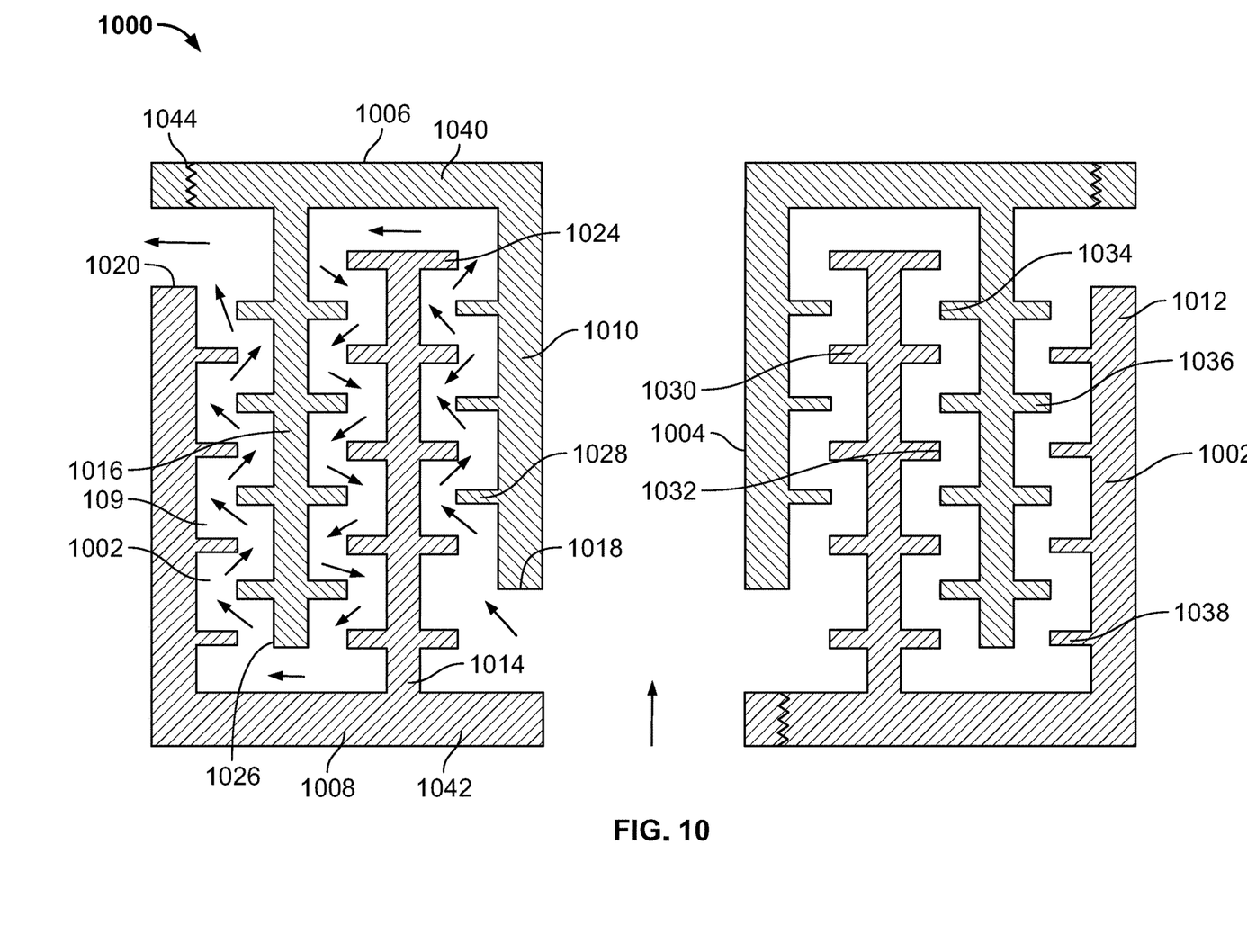
FIG. 10 illustrates a cross-sectional view of another example cage in accordance with a ninth disclosed example of the present invention.

Referring back to the cage 105, the cage 105 includes an inner wall 126, an outer wall 128, and an intermediate wall 130. The intermediate wall 130 is disposed between the inner wall 126 and the outer wall 128. In the example shown, the inner wall 126 and the outer wall 128 extend from the upper portion 118 of the cage 105 and the intermediate wall 130 extends from the lower portion 120 of the cage 105. While the cage 105 is illustrated including three walls in the example of FIG. 1, the cage 105 may alternatively include four walls (see, for example, FIG. 10) or five walls (see, for example, FIG. 11). Providing the cage 105 with an odd number of walls 126, 128, 130 allows a height of the cage 105 to be reduced because openings of the cage are on the same side. Alternatively, if the cage 105 has an even number of walls such as shown in FIG. 10, the openings of the cage are at opposing ends and the height of the cage may be increased.

The inner wall 126 of the cage 105 includes an inlet opening 132 and the outer wall 128 of the cage 105 includes an outlet opening 134. In the example shown, the control valve 100 is configured in a flow-up configuration. However, the control valve 100 may alternatively be configured in a flow-down configuration. In a flow-down configuration, the opening 132 may be an outlet opening and the opening 134 may be an inlet opening.

The inner wall 126, the outer wall 128, and the intermediate wall 130 cooperate to define a portion 137 of the flow passage 109. The portion 137 of the flow passage 108 extends from the inlet opening 132 of the cage 105 to the outlet opening 134 of the cage 105. Specifically, the portion 137 of the flow passage 109 extends from the inlet opening 132, between the inner wall 126 and the intermediate wall 130, past a terminal portion 138 of the intermediate wall 130, between the intermediate wall 130 and the outer wall 128, to the outlet opening 134. The portion 137 of the flow passage 109 of FIG. 1 is generally U-shaped or generally V-shaped. However, the portion 137 of the flow path 108 may have another configuration such as the N-shaped configuration shown in FIG. 10 or the M-shaped configuration shown in FIG. 11.

Figure 2:
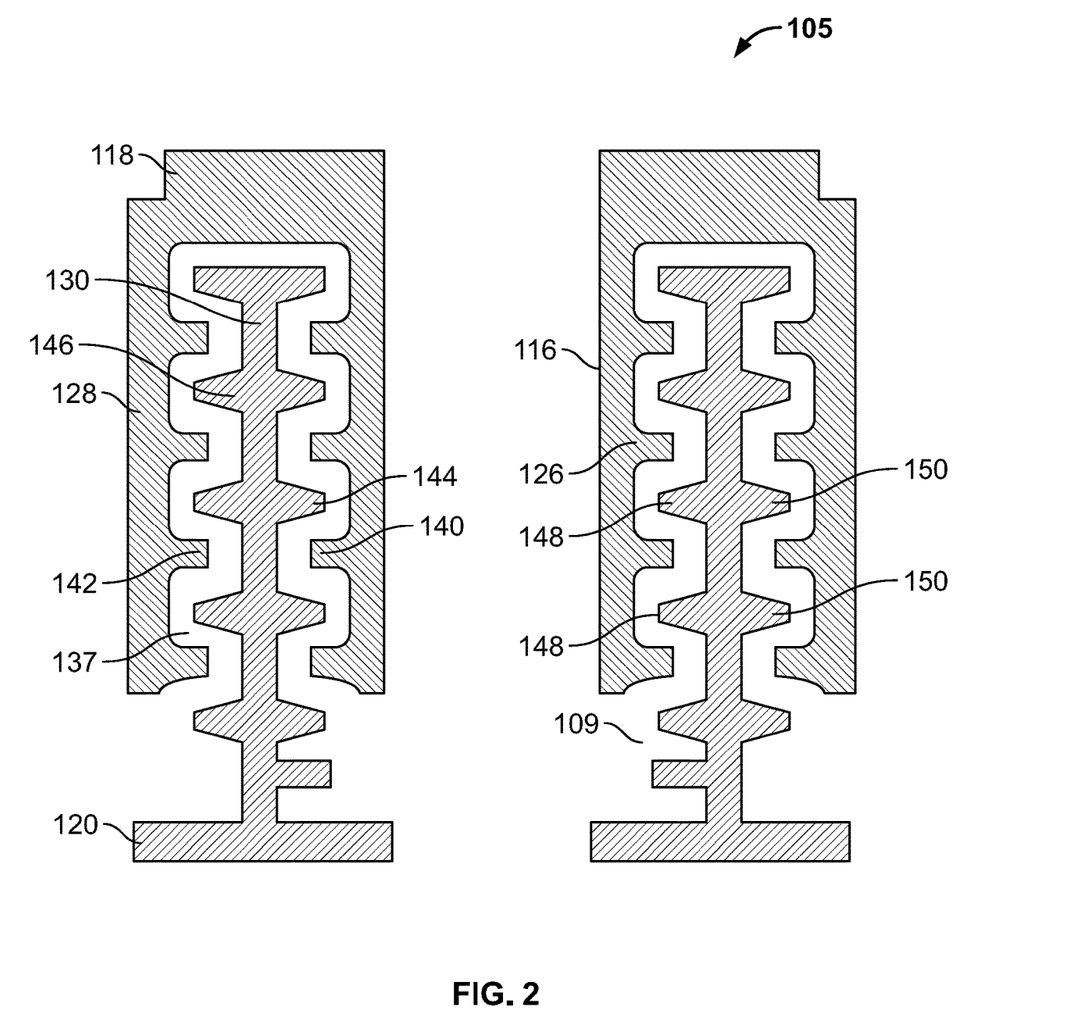
FIG. 2 illustrates a detailed cross sectional view of the cage of the control valve of FIG. 1.

FIG. 2 illustrates a detailed cross sectional view of the cage 105 of the control valve 100 of FIG. 1. In the example shown, the inner wall 126 and the outer wall 128 includes protrusions 140, 142 that extend into the portion 137 of the flow passage 109 and the intermediate wall 130 incudes inwardly and outwardly extending protrusions 144, 146 that extend into the portion 137 of the flow passage 109. The protrusions 140, 142, 144, 146 may be annular ribs, arc-shaped ribs, or fins and are positioned and sized to allow the cage 105 to be used with fluid that is considered dirty. As used herein, the phrase "dirty fluid" refers to fluid that includes larger particles such as fluid associated with hydrocarbon refinement and exploration. Thus, the flow area through the flow passage 109 between the walls 126, 128, 130 is adapted to deter the flow passage 109 from becoming clogged.

In the example shown, the protrusions 140 of the inner wall 126 outwardly extend toward the intermediate wall 130 and the protrusions 142 of the outer wall 128 extend toward the intermediate wall 130. The protrusions 140, 144 of the inner and outer walls 126, 128 and the protrusions 142, 146 of the intermediate wall 130 cooperate to form a plurality of pressure drops (pressure stages) along the portion 137 of the flow passage 109. The portion 137 of the flow passage 109 extends between the adjacent walls 126 and 130 and 128 and 130. Advantageously, the pressure drops formed between the corresponding protrusions 140, 144 and 142, 146 reduce the likelihood that the pressure of the fluid will drop below the vapor pressure of the fluid. Thus, the cage 105 reduces the likelihood that flashing and/or cavitation occurs.

In the example shown, the protrusions 140, 142 carried by the inner wall 126 and the outer wall 128 are vertically offset from the protrusions 144, 146 carried by the intermediate wall 130. Additionally, pairs of the protrusions 140, 142, 144, 146 carried by the respective walls 126, 128, 130 are vertically spaced an equal distance and/or a substantially equal distance. For example, a first pair 148 of the inwardly extending protrusions 144 of the intermediate wall 130 and a second pair 150 of the outwardly extending protrusions 146 of the intermediate wall 130 are vertically spaced an equal distance and/or a substantially equal distance. Equally spacing the protrusions 140, 142, 144, 146 as shown in FIG. 2 allows the pressure drops at the different pressure stages to be the same or similar. Alternatively, the spacing between the protrusions 140, 142, 144, 146 may be different, allowing for different pressure drops to be achieved (see, for example, FIG. 9). As set forth herein, the phrase "substantially equal distance" accounts for manufacturing tolerances and/or means distances within approximately 5% of one another.

The protrusions 140 carried by the inner wall 126 overlap the inwardly extending protrusions 144 carried by the intermediate wall 130 and the protrusions 142 carried by the outer wall 128 overlap the outwardly extending protrusions 146 carried by the intermediate wall 130. Overlapping the protrusions 140, 144 and 142, 146 may increase the pressure drop provided between the corresponding protrusions 140, 142, 144, 146. However, alternatively, the opposing protrusions 140, 144 and 142, 146 may not overlap (see, for example, FIGS. 4, 5, 6, 9, 10, 11).

In the example shown, the protrusions 140, 142 of the inner and outer walls 126, 128 are mirror images of one another and the inwardly and outwardly extending protrusions 144, 146 of the intermediate wall 130 are mirror images of one another. However, the protrusions 140, 142, 144, 146 may be differently positioned such that the protrusions 140, 142, 144, 146 of the walls 126, 128, 130 are vertically offset. Additionally, while the protrusions 140, 142, 144, 146 are disposed in a particular position relative to one another, one or more of the protrusions 140, 142, 144, 146 may be in a different position. For example, the protrusions 140 carried by the inner wall 126 may be spaced such that a distance between a first pair of the protrusions 140 is different than a distance between a second pair of the protrusions 140. The protrusions 140, 142 have a substantially rectangular cross-section and the inwardly and outwardly extending protrusions 144, 146 have a frustrum and/or a quadrilateral shaped cross section. Alternatively, one or more of the protrusions 140, 142, 144, 146 may have a different cross-section than shown (see, for example, FIGS. 3, 7, 8, 9, 10).

In the example shown, the inner wall 126, the outer wall 128, and the intermediate wall 130 are parallel and/or substantially parallel to one another. As set forth herein, the phrase "substantially parallel" accounts for manufacturing tolerances and/or means approximately 5% of parallel. Thus, in the example shown, the inner wall 126, the outer wall 128, and the intermediate wall 130 have substantially coaxial surfaces. However, alternatively, the intermediate wall 130 may be angled relative to at least one of the inner wall 126 and the outer wall 128 (see, for example, FIGS. 8, 9).

Figure 3:
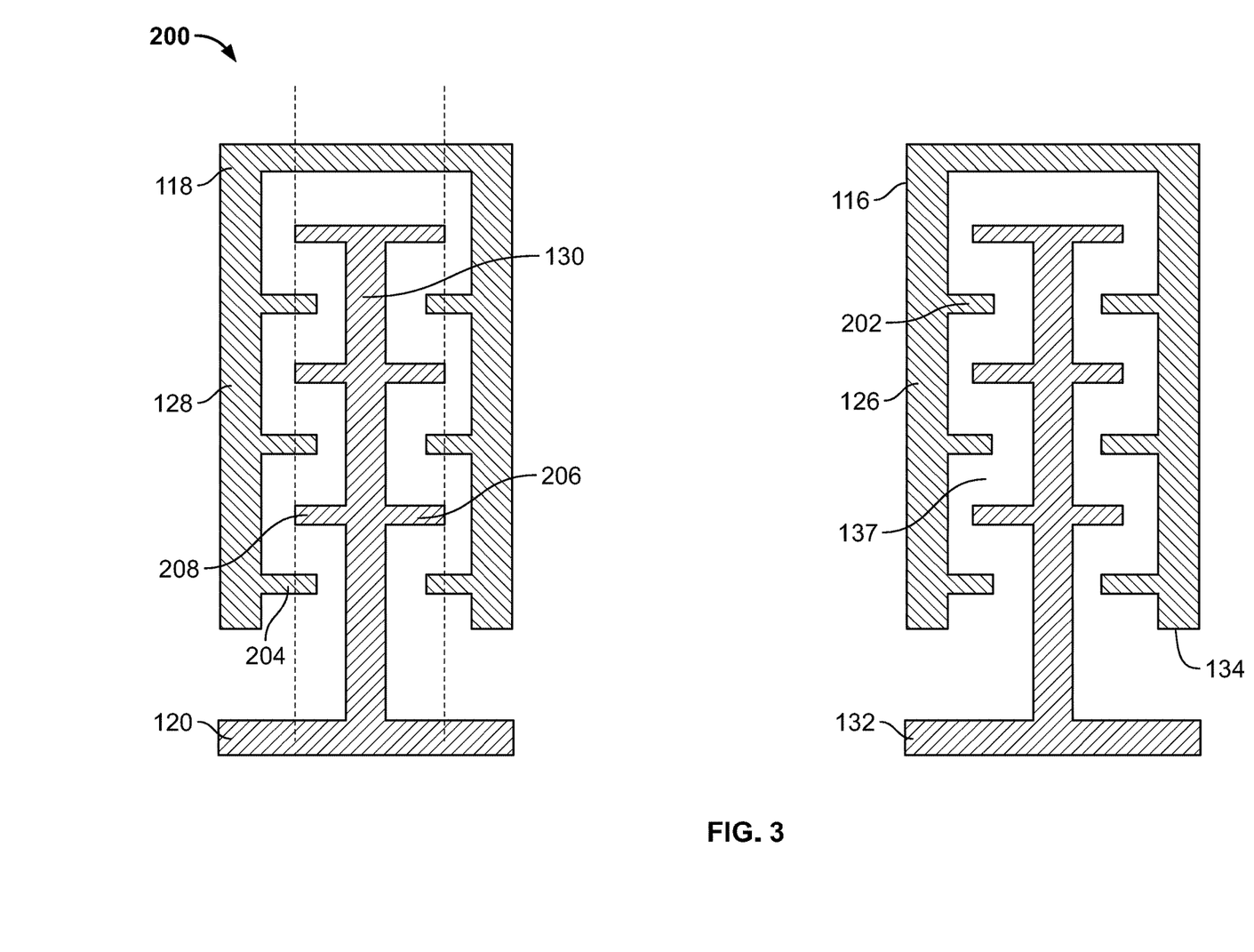
FIG. 3 illustrates a cross-sectional view of another example cage in accordance with a second disclosed example of the present invention.

FIG. 3 illustrates a cross-sectional view of another example cage 200 in accordance with a second disclosed example of the present invention. The cage 200 is similar to the cage 105 of FIG. 1 and can be used with the control valve 100 of FIG. 1 instead of using the cage 105. Elements of the cage 200 which are the same or similar to the cage 105 are designated by the same reference numeral. A description of these elements is abbreviated or eliminated in the interest of brevity.

In the example shown, the inner wall 126 includes protrusions 202 that extend into the portion 137 of the flow passage 109, the outer wall 128 includes protrusions 204 that extend into the portion 137 of the flow passage 109, and the intermediate wall 130 includes inwardly extending protrusions 206 and outwardly extending protrusions 208 that extend into the portion 137 of the flow passage 109. The protrusions 202, 204, 206, 208 have a substantially rectangular cross section. However, one or more of the protrusions 202, 204, 206, 208 may have a different cross section. Pressure drops are formed between the associated protrusions 202, 204, 206, 208.

At least some of the inwardly extending protrusions 206 of the intermediate wall 130 are interposed between corresponding ones of the protrusions 202 of the inner wall 126 and at least some of the outwardly extending protrusions 208 of the intermediate wall 130 are interposed between corresponding ones of the protrusions 204 of the outer wall 128.

The protrusions 202 carried by the inner wall 126 are a different length than the protrusions 204 carried by the outer wall 128 and the inwardly extending protrusions 206 of the intermediate wall 130 are a different length than the outwardly extending protrusions 208 of the intermediate wall 130. In the example shown, the protrusions 202 of the inner wall 126 are shorter than the protrusions 204 of the outer wall 128 and the inwardly extending protrusions 206 of the intermediate wall 130 are longer than the outwardly extending protrusions 208 of the intermediate wall 130. However, if the cage 200 is used in a flow-down configuration, the relative lengths of the protrusions 202, 204, 206, 208 may be different. As an example, in a flow-down configuration, the length of the protrusions 202 of the inner wall 126 may be longer, the inwardly extending protrusions 206 of the intermediate wall 130 may be shorter, the outwardly extending protrusions 208 of the intermediate wall 130 may be longer, and the protrusions 204 of the outer wall 128 may be shorter. However, the length and/or the cross section of the protrusions 202, 204, 206, 208 may change depending on the application.

Figure 4:
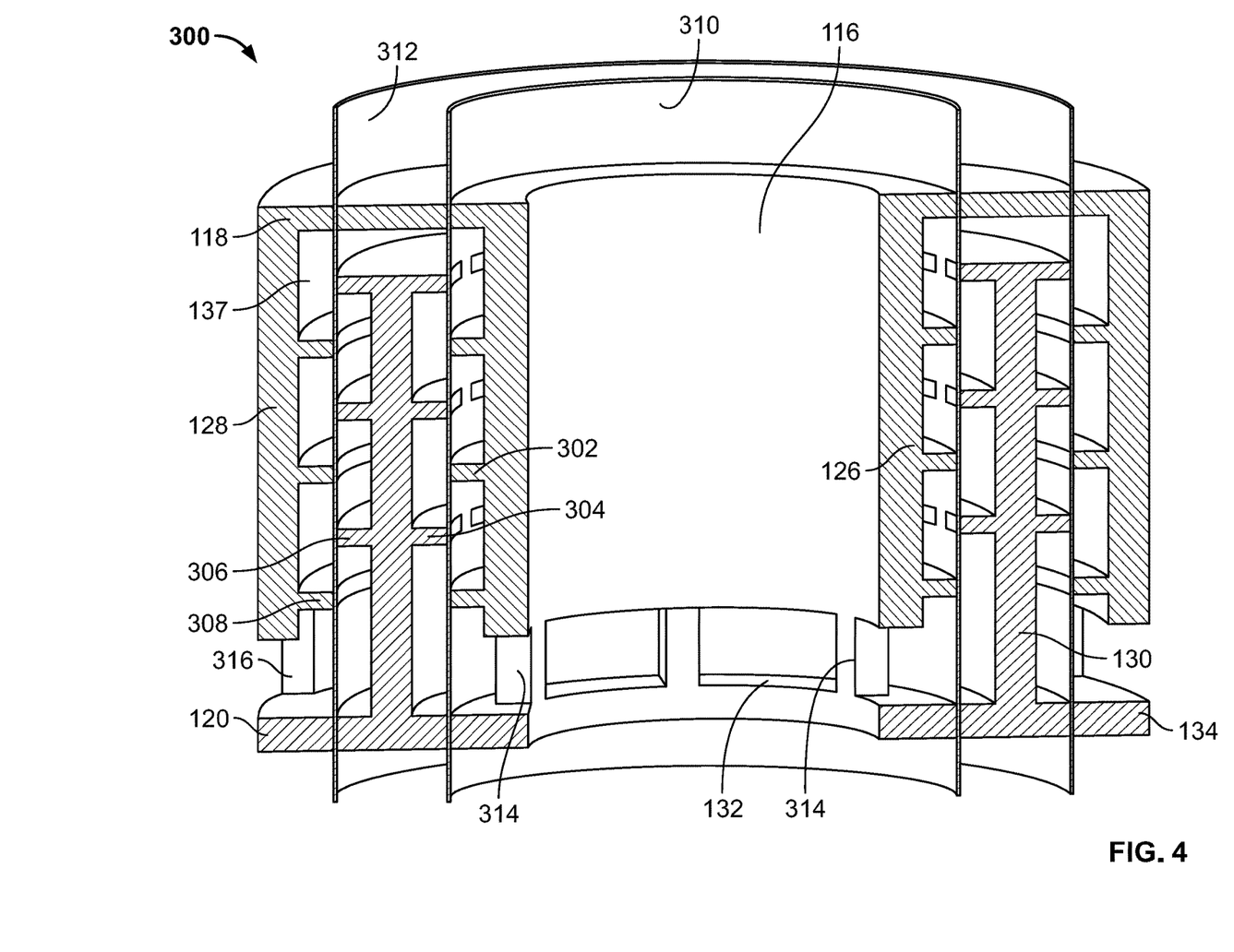
FIG. 4 illustrates an isometric cross-sectional view of another example cage in accordance with a third disclosed example of the present invention.

FIG. 4 illustrates an isometric cross-sectional view of another example cage 300 in accordance with a third disclosed example of the present invention. The cage 300 is similar to the cage 200 of FIG. 3 and can be used with the control valve 100 of FIG. 1 instead of using the cage 105. Elements of the cage 300 which are the same or similar to the cage 200 are designated by the same reference numeral. A description of these elements is abbreviated or eliminated in the interest of brevity.

In contrast to the cage 200 of FIG. 3, the cage 300 of FIG. 4 includes protrusions 302, 304, 306, 308 that do not overlap. Reference cylinders 310, 312 are included to illustrate that the protrusions 302, 304 meet at the reference cylinder 310 but do not overlap and that the protrusions 306, 308 meet at the reference cylinder 312 but do not overlap. Additionally, in the example shown, the protrusions 302 of the inner wall 126 are substantially the same length as the protrusions 308 of the outer wall 128 and the inwardly extending protrusions 304 of the intermediate wall 130 are substantially the same length as the outwardly extending protrusions 306 of the intermediate wall 130.

In the example shown, the inlet opening 132 is separated by inner dividers 314 and the outlet opening 134 is separated by outer dividers 316. The inner dividers 314 do not extend between the inner wall 126 and the intermediate wall 130 and the outer dividers 316 do not extend between the intermediate wall 130 and the outer wall 128. However, alternatively, the inner dividers 314 may extend between the inner wall 126 and the intermediate wall 130 (see, for example, FIGS. 7, 9) and the outer dividers 316 may extend between the intermediate wall 130 and the outer wall 128 (see, for example, FIGS. 7 and 9). The inner dividers 314 may have different contours to allow the cage 300 to achieve different flow characteristics such as a linear flow characteristic, a quick open flow characteristic, or an equal percentage flow characteristic. The control element 106 may also have a contour to allow the control valve 100 to achieve different flow characteristics such as a linear flow characteristic, a quick open flow characteristic, or an equal percentage flow characteristic.

Figure 5:
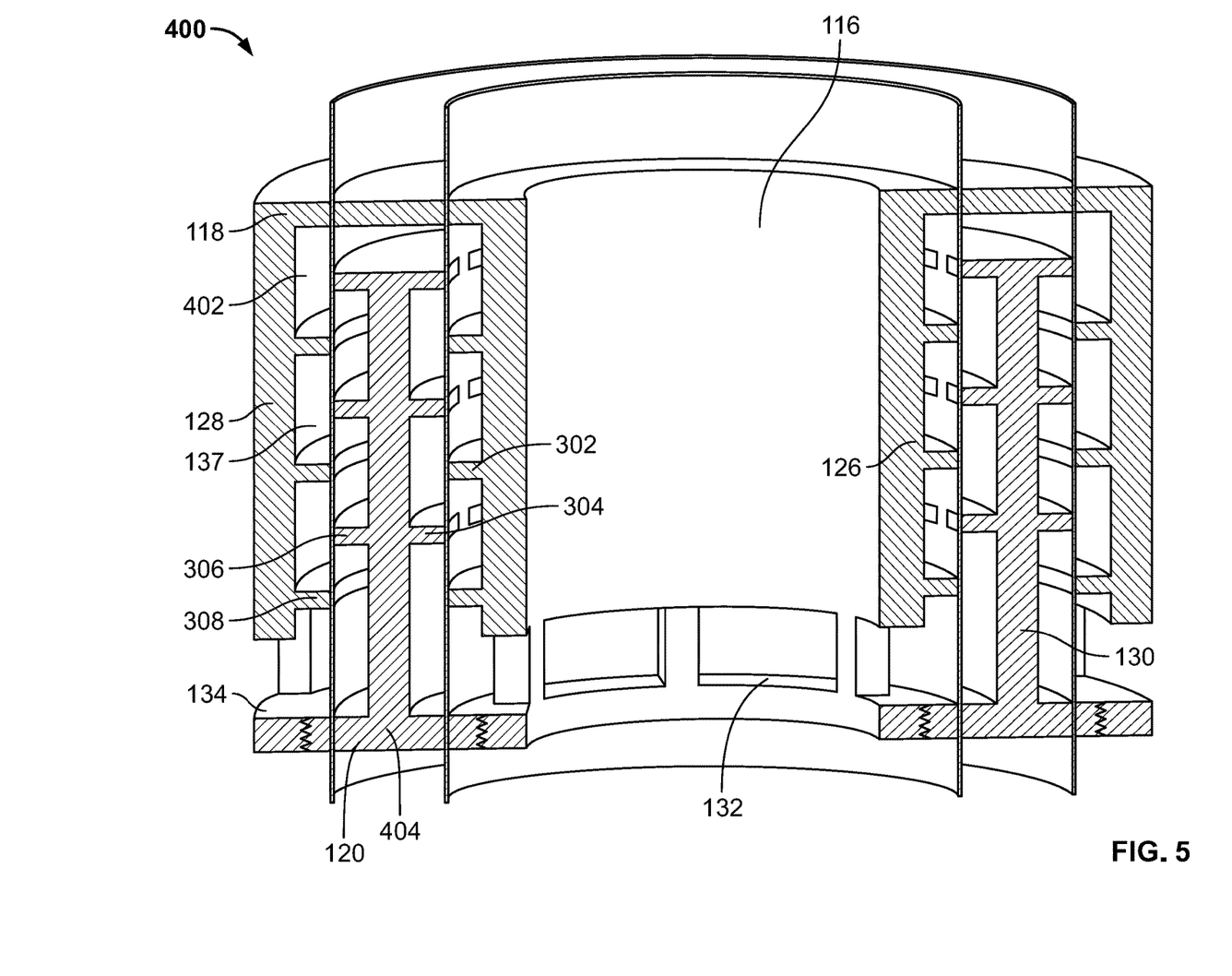
FIG. 5 illustrates an isometric cross-sectional view of another example cage in accordance with a fourth disclosed example of the present invention.

FIG. 5 illustrates an isometric cross-sectional view of another example cage 400 in accordance with a fourth disclosed example of the present invention. The cage 400 is similar to the cage 300 of FIG. 4 and can be used with the control valve 100 of FIG. 1 instead of using the cage 105. Elements of the cage 400 which are the same or similar to the cage 300 are designated by the same reference numeral. A description of these elements is abbreviated or eliminated in the interest of brevity.

In contrast to the cage 300 of FIG. 4, the upper portion 118 of the cage 400 is coupled to the lower portion 120 of the cage 400. Specifically, in the example shown, the cage 400 includes a first portion 402 and a second portion 404. The first and second portions 402, 404 are threadly coupled. Thus, the first and second portions 402, 404 of the cage 400 are removably coupled. The first portion 402 of the cage 400 includes the upper portion 118 of the cage 400 and the inner and outer walls 126, 128 and the second portion 404 of the cage 400 of FIG. 5 includes a portion of the lower portion 120 of the cage 400 and the intermediate wall 130.

Figure 6:
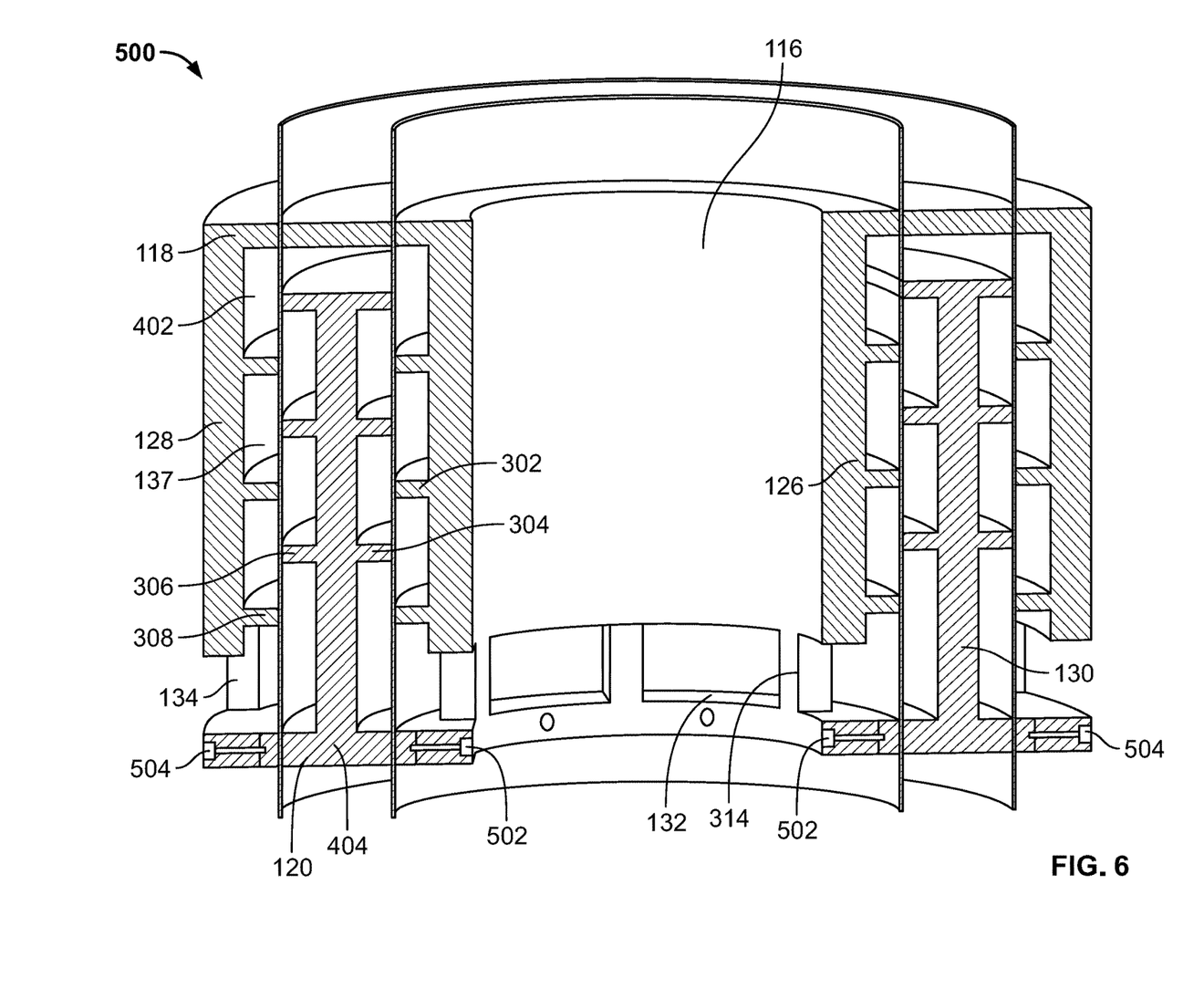
FIG. 6 illustrates an isometric cross-sectional view of another example cage in accordance with a fifth disclosed example of the present invention.

FIG. 6 illustrates an isometric cross-sectional view of another example cage 500 in accordance with a fifth disclosed example of the present invention. The cage 500 is similar to the cage 400 of FIG. 5 and can be used with the control valve 100 of FIG. 1 instead of using the cage 105. Elements of the cage 500 which are the same or similar to the cage 400 are designated by the same reference numeral. A description of these elements is abbreviated or eliminated in the interest of brevity.

In contrast to the cage 400 of FIG. 5, the cage 500 of FIG. 6 includes outwardly extending fasteners 502 and inwardly extending fasteners 504 that are used to couple the first and second portions 402, 404 of the cage 500 together.

Figure 7:
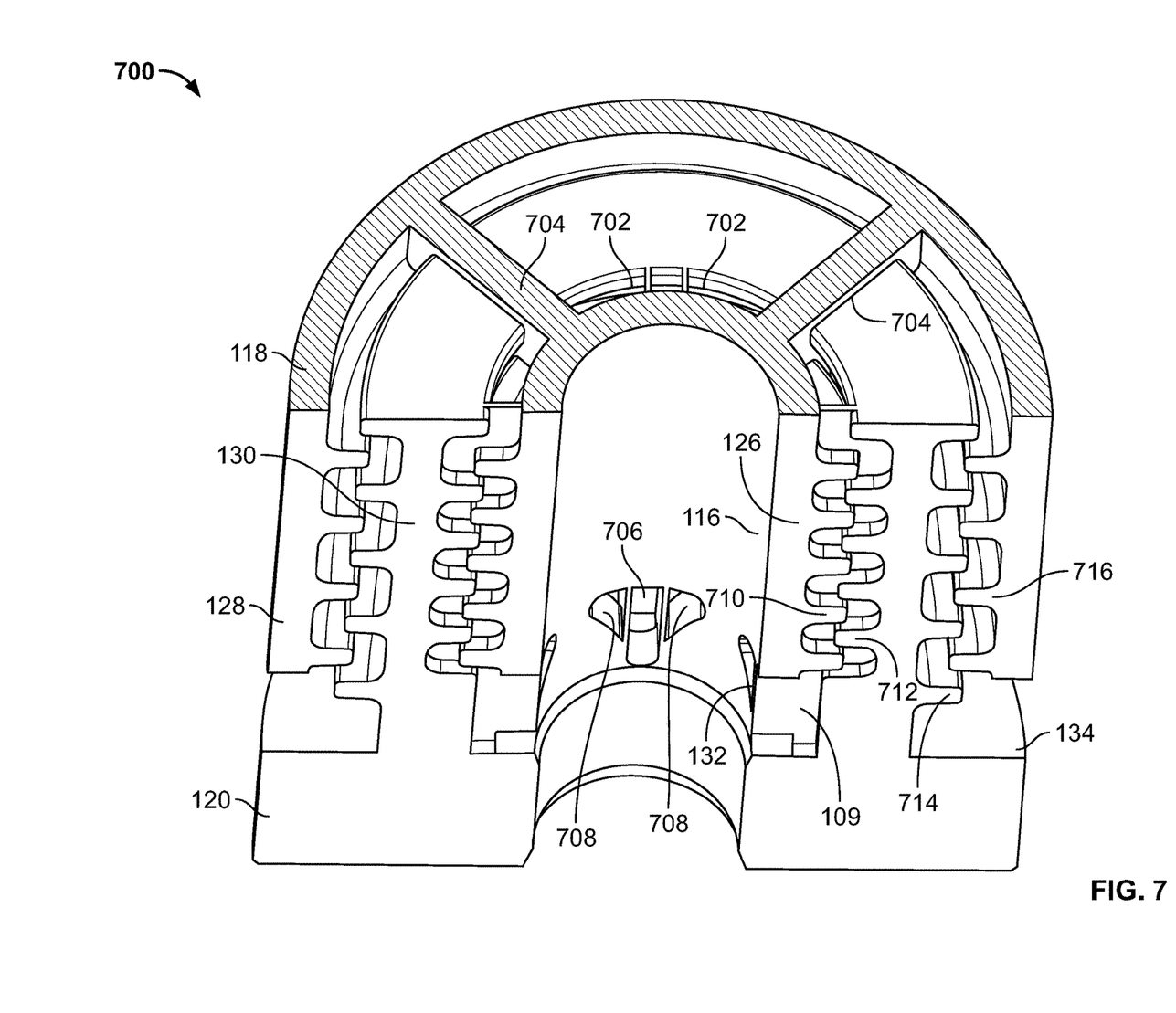
FIG. 7 illustrates an isometric cross-sectional view of another example cage in accordance with a sixth disclosed example of the present invention.

FIG. 7 illustrates an isometric cross-sectional view of another example cage 700 in accordance with a sixth disclosed example of the present invention. The cage 700 can be used with the control valve 100 of FIG. 1 instead of using the cage 105.

The cage 700 of FIG. 7 includes inner dividers 702 that couple the inner wall 126 and the intermediate wall 130 and inner and outer dividers 704 that extend between the inner wall 126 and the outer wall 128. The dividers 702, 704 separate the portion 137 of the flow passage 109 between the inner wall 126 and the intermediate wall 130 and between the intermediate wall 130 and the outer wall 128 into a plurality of sub-portions and separate the inlet opening 132 into a plurality of inlet-sub openings 706, 708.

The central inlet-sub opening 706 is vertically off-set from the exterior inlet sub-openings 708. The exterior inlet sub-openings 708 are teardrop shaped. The teardrop shape allows fluid flow through the corresponding sub-portions of the flow passage 109 to be incrementally increased as the control element 106 moves from the closed position to the open position. The central inlet-sub opening 706 has a rectangular cross-section with an arc-shaped bottom.

The inner wall 126 includes outwardly extending protrusions 710, the intermediate wall 130 includes inwardly extending protrusions 712 and outwardly extending protrusions 714, and the outer wall 128 includes inwardly extending protrusions 716.

Figure 8:
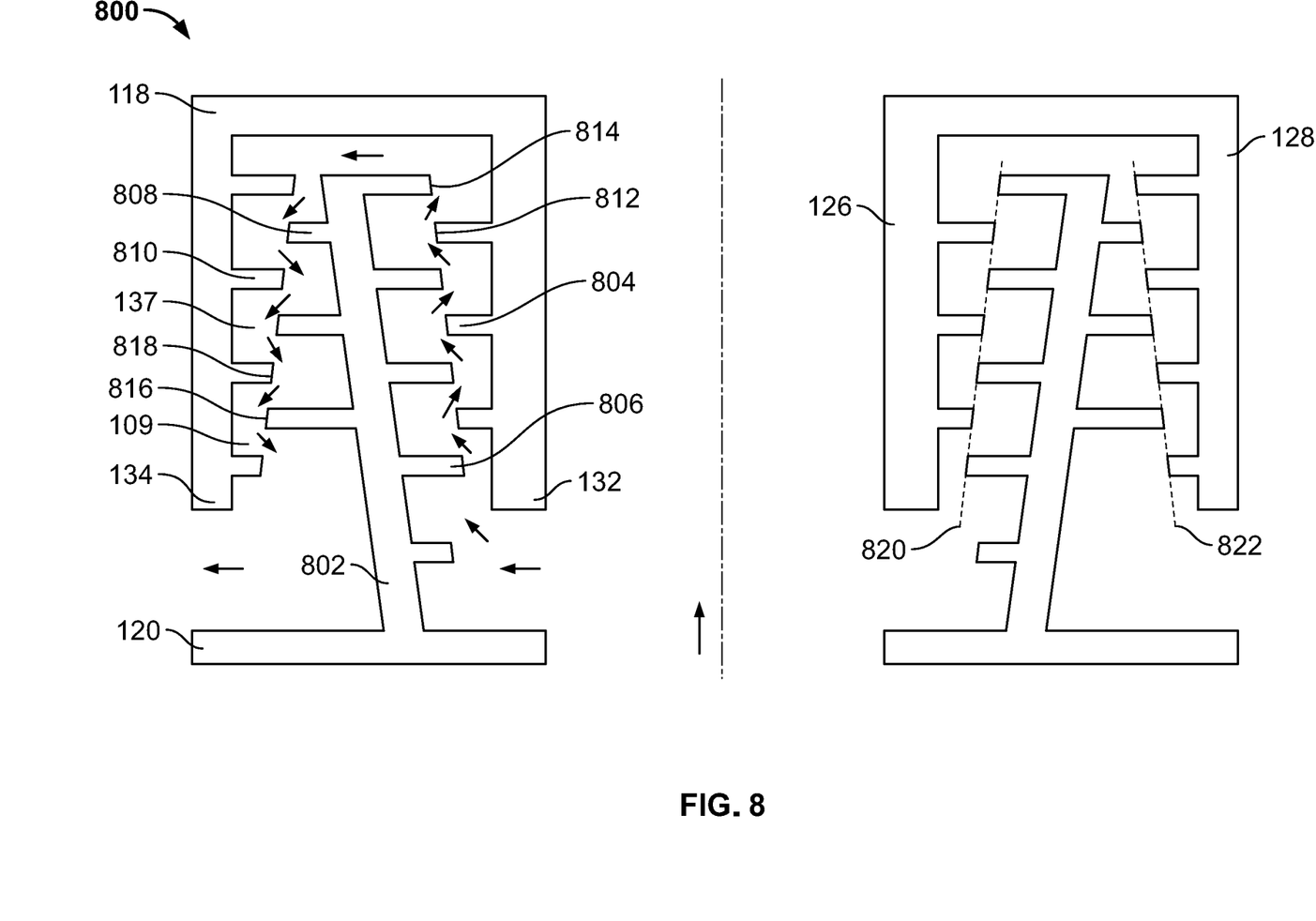
FIG. 8 illustrates a cross-sectional view of another example cage in accordance with a seventh disclosed example of the present invention.

FIG. 8 illustrates a cross-sectional view of another example cage 800 in accordance with a seventh disclosed example of the present invention. The cage 800 is similar to the cage 300 of FIG. 4 and can be used with the control valve 100 of FIG. 1 instead of using the cage 105. Elements of the cage 800 which are the same or similar to the cage 300 are designated by the same reference numeral. A description of these elements is abbreviated or eliminated in the interest of brevity.

In contrast to the cage 300 of FIG. 4, the cage 800 of FIG. 8 includes an intermediate wall 802 that is angled relative to the inner wall 126 and the outer wall 128. Specifically, the intermediate wall 802 is disposed at an angle relative to a longitudinal axis of the cage 800 and the control valve 100 when the cage 800 is disposed within the control valve 100. The angle may be between about 10° and 20° relative to the longitudinal axis of the cage 800. However, the intermediate wall 802 may be disposed at any other angle.

The inner wall 126 includes outwardly extending protrusions 804, the intermediate wall 802 includes inwardly extending protrusions 806 and outwardly extending protrusions 808, and the outer wall 128 includes inwardly extending protrusions 810. Portions (e.g., ends) 812, 814, 816, 818 of the protrusions 804, 806, 808, 810 are angled relative to the longitudinal axis of the cage 800. The portions 812, 814 of the protrusions 804, 806 meet at an inner reference cone 820 and the portions 816, 818 of the protrusions 808, 810 meet at an outer reference cone 822. Having the portions 812, 814 meet at the inner reference cone 820 and having the portions 816, 818 meet at the outer reference cone 822 reduces a gap between adjacent/corresponding protrusions 804, 806 and 808, 810 and allows a larger pressure drop to occur across the pressure stages.

A length of the outwardly extending protrusions 804 of the inner wall 126 and a length of the inwardly extending protrusions 806 of the intermediate wall 802 increases between the lower portion 120 of the cage 800 and the upper portion 118 of the cage 800. A length of the outwardly extending protrusions 808 of the intermediate wall 802 decreases between the lower portion 120 of the cage 800 and the upper portion 118 of the cage 800 and a length of the inwardly extending protrusions 810 of the outer wall 128 increases between the lower portion 120 of the cage 800 and the upper portion 118 of the cage 800.

Pressure drops/pressure stages are formed between the protrusions 804, 806 and between the protrusions 808, 810. The angle of the intermediate wall 802 relative to the inner wall 126 allows an area of the corresponding pressure drops to gradually increase between the inner wall 126 and the intermediate wall 802 and between the intermediate wall 802 and the outer wall 128 between the inlet opening 132 and the outlet opening 134. Gradually increasing the flow area along the portion 137 of the flow passage 109 between the inlet opening 132 and the outlet opening 134 allows the pressure to be decreased in a controlled manner and reduces the likelihood that the pressure reaches or goes below the vapor point of the fluid. Additionally, gradually increasing the flow area between the inlet opening 132 and the outlet opening 134 may reduce the velocity of the fluid and may reduce vibration from outgassing or flashing.

Figure 9:
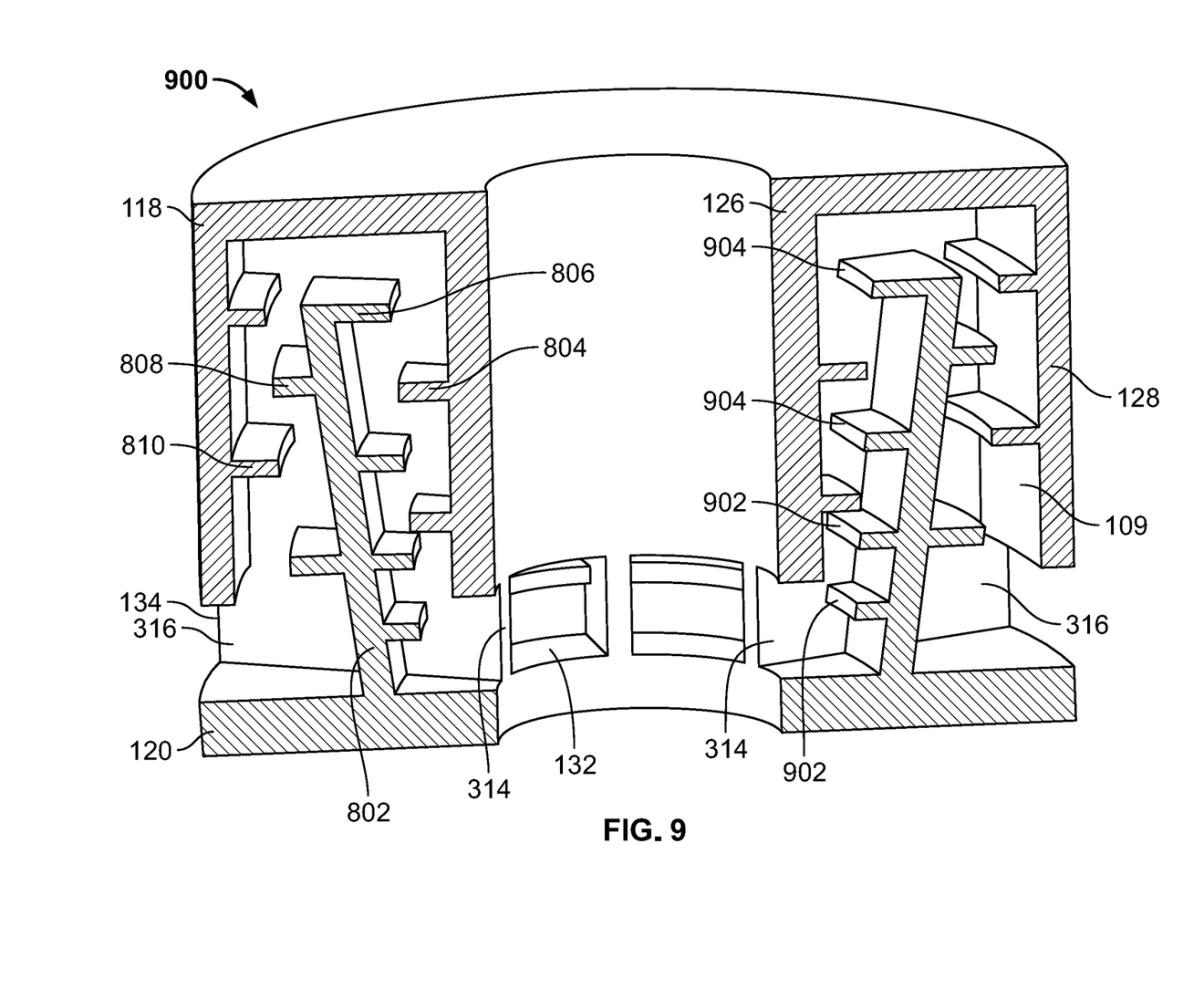
FIG. 9 illustrates an isometric cross-sectional view of another example cage in accordance with an eighth disclosed example of the present invention.

FIG. 9 illustrates an isometric cross-sectional view of another example cage 900 in accordance with an eighth disclosed example of the present invention. The cage 900 is similar to the cage 800 of FIG. 8 and can be used with the control valve 100 of FIG. 1 instead of using the cage 105. Elements of the cage 900 which are the same or similar to the cage 800 are designated by the same reference numeral. A description of these elements is abbreviated or eliminated in the interest of brevity.

In contrast to the cage 800 of FIG. 8, a first pair 902 of the inwardly extending protrusions 806 are vertically spaced a first distance apart and a second pair 904 of the inwardly extending protrusions 806 are vertically spaced a second distance apart. The first distance is different (less) than the second distance. In the example shown, the inner dividers 314 extend between the inner wall 126 and the intermediate wall 802 and the outer dividers 316 extend between the intermediate wall 802 and the outer wall 128.

FIG. 10 illustrates a cross-sectional view of another example cage 1000 in accordance with a ninth disclosed example of the present invention. The cage 1000 includes a generally cylindrical body 1002 having a central bore 1004, an upper portion 1006, and a lower portion 1008. The cage 1000 also includes an inner wall 1010, an outer wall 1012, an inner intermediate wall 1014, and an outer intermediate wall 1016. The inner wall 1010 includes an inlet opening 1018 and the outer wall 1012 includes an outlet opening 1020. The inlet opening 1018 is positioned adjacent the lower portion 1008 of the cage 1000 and the outlet opening 1020 is positioned adjacent the upper portion 1006 of the cage 1000.

The inner intermediate wall 1014 and the outer intermediate wall 1016 are disposed between the inner wall 1010 and the outer wall 1012. In the example shown, the inner intermediate wall 1014 extends from the lower portion 1008 of the cage 1000 and the outer intermediate wall 1016 extends from the upper portion 1006 of the cage 1000.

The inner wall 1010, the outer wall 1012, the inner intermediate wall 1014, and the outer intermediate wall 1016 cooperate to define a portion 1022 of the flow passage 109 that extends from the inlet opening 1018 to the outlet opening 1020. The portion 1022 of the flow passage 109 extends from the inlet opening 1018, between the inner wall 1010 and the inner intermediate wall 1014, past a terminal portion 1024 of the inner intermediate wall 1014, between the inner intermediate wall 1014 and the outer intermediate wall 1016, past a terminal portion 1026 of the outer intermediate wall 1016, between the outer intermediate wall 1016 and the outer wall 1012, to the outlet opening 1020. The inner intermediate wall 1014 and the outer intermediate wall 1016 may alternatively be referred to as first and second intermediate walls.

The inner wall 1010 includes outwardly extending protrusions 1028, the inner intermediate wall 1014 includes inwardly extending protrusions 1030 and outwardly extending protrusions 1032, the outer intermediate wall 1016 includes inwardly extending protrusions 1034 and outwardly extending protrusions 1036, and the outer wall 1012 includes inwardly extending protrusions 1038. Thus, at least one of the inner wall 1010 and the outer wall 1012 includes a plurality of protrusions 1028, 1038 extending into the portion 1022 of the flow passage 109 and the inner intermediate wall 1014 and the outer intermediate wall 1016 includes the protrusions 1030, 1032, 1034, 1036 extending into the portion 1022 of the flow passage 109. The protrusions 1028, 1030, 1032, 1034, 1036, 1038 of the illustrated example have a rectangular cross-section. However, one or more of the protrusions 1028-1038 may have a different cross-section.

In the example shown, the cage 1000 includes a first portion 1040 and a second portion 1042. The first portion 1040 of the cage 1000 includes a portion of the upper portion 1006 of the cage 1000, the inner wall 1010, and the outer intermediate wall 1016. The second portion 1042 of the cage 1000 includes a portion of the upper portion 1006 of the cage 1000, the inner intermediate wall 1014, and the outer wall 1012. The first portion 1040 is coupled to the second portion 1042 via threads 1044. Alternatively, the cage 1000 and any of the disclose cages 105, 200, 300, 400, 500, [[600,]] 700, 800, 900, 1000 may be coupled in a different way or may be formed as a single part. The single part may be formed using an additive manufacturing process, a milling process, a forging process, etc.

Figure 11:
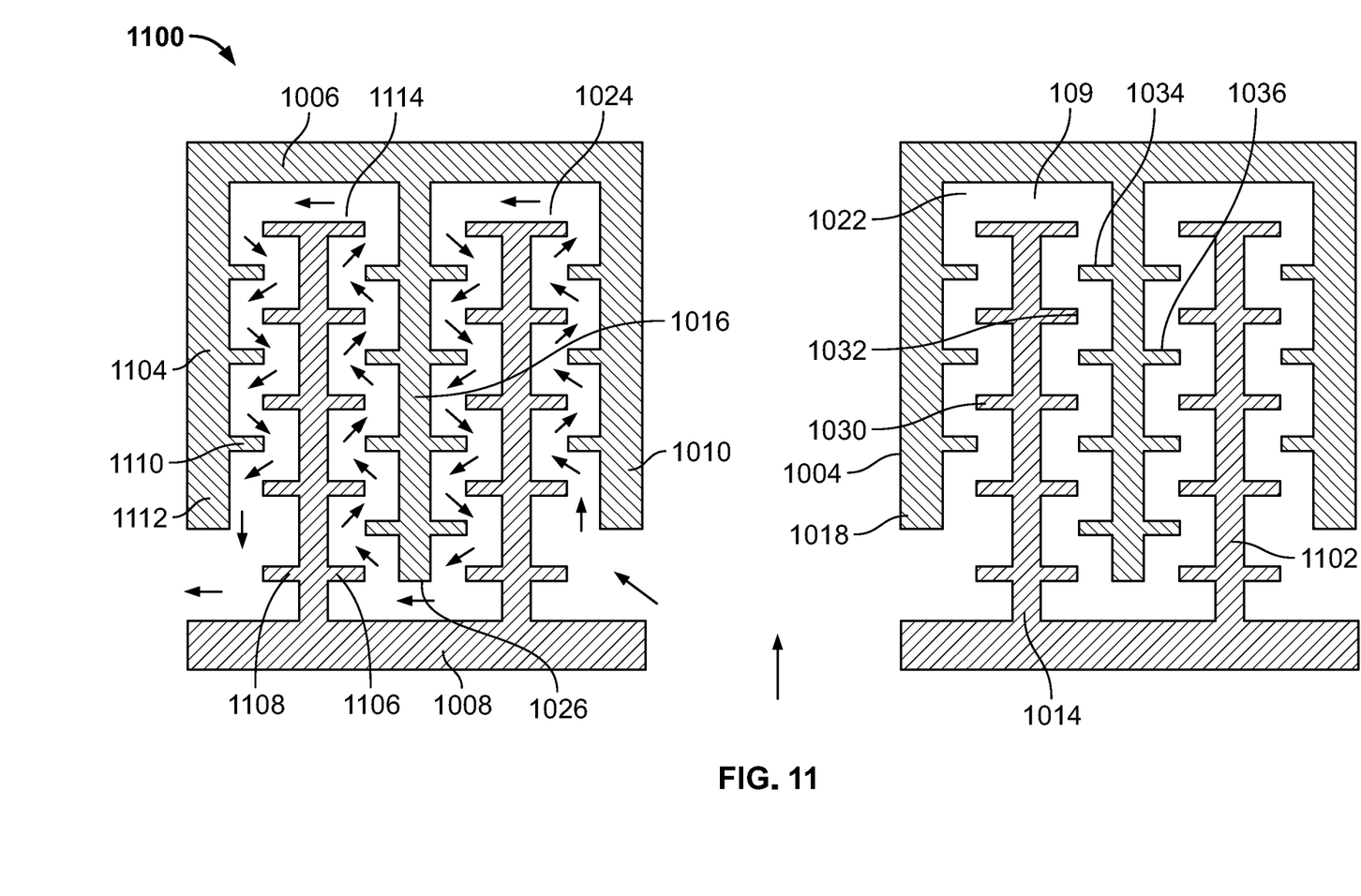
FIG. 11 illustrates a cross-sectional view of another example cage in accordance with a tenth disclosed example of the present invention.

FIG. 11 illustrates a cross-sectional view of another example cage 1100 in accordance with a tenth disclosed example of the present invention. The cage 1100 is similar to the cage 1000 of FIG. 10 and can be used with the control valve 100 of FIG. 1 instead of using the cage 105. Elements of the cage 1100 which are the same or similar to the cage 1000 are designated by the same reference numeral. A description of these elements is abbreviated or eliminated in the interest of brevity.

In contrast to the cage 1000 of FIG. 10, the cage 1100 of FIG. 11 includes the first intermediate wall 1014, the second intermediate wall 1016, and a third intermediate wall 1102. The first, second, and third intermediate walls 1014, 1016, 1102 are disposed between the inner wall 1010 and an outer wall 1104 of the cage 1100. The third intermediate wall 1102 includes inwardly extending protrusions 1106 and outwardly extending protrusions 1108 and the outer wall 1104 includes inwardly extending protrusions 1110. The inner wall 1010 includes the inlet opening 1018 and the outer wall 1104 includes an outlet opening 1112. The inlet opening 1018 and the outlet opening 1112 are both positioned adjacent the lower portion 1008 of the cage 1100.

The inner wall 1010, the second intermediate wall 1016, and the outer wall 1104 extend from the upper portion 1006 of the cage 1100 and the first intermediate wall 1014 and the third intermediate wall 1102 extend from the lower portion 1008 of the cage 1100. In the example shown, the portion 1022 of the flow passage 109 extends from the inlet opening 1018, between the inner wall 1010 and the first intermediate wall 1014 and past the terminal portion 1024 of the first intermediate wall 1014. The portion 1022 of the flow passage 109 also extends between the first intermediate wall 1014 and the second intermediate wall 1016, past the terminal portion 1026 of the second intermediate wall 1016, between the second intermediate wall 1016 and the third intermediate wall 1102, past a terminal portion 1114 of the third intermediate wall 1102, between the third intermediate wall 1102 and the outer wall 1104, to the outlet opening 1112.

From the foregoing, it will be appreciated that the above disclosed apparatus, methods and articles of manufacture enable cages to be produced including internal channels. The channels may be separated by an intermediate wall disposed between an inner wall and an outer wall of the cage. The walls of the cage include ribs that form corresponding pressure stages. The flow area defined between the ribs may gradually increase between an inlet of the cage and an outlet of the cage when the cage is configured in a flow-up configuration or a flow-down configuration allowing for the pressure of the fluid to decrease gradually at each stage. If outgassing or flashing occurs, the increased flow area may reduce the velocity of the fluid.

Further, while several examples have been disclosed herein, any features from any examples may be combined with or replaced by other features from other examples. Moreover, while several examples have been disclosed herein, changes may be made to the disclosed examples within departing from the scope of the claims.

What is claimed is:

1. A control valve, comprising:
a valve body having an inlet, an outlet, and defining a flow passage between the inlet and the outlet;
an orifice disposed in the flow passage and having a valve seat;
a generally cylindrical cage being disposed within the valve body and having a central bore, an upper portion, and a lower portion, the lower portion seated against the valve seat;
a control element slidably received in the central bore of the cage and being shiftable between a closed position in which the control element is seated against the valve seat thereby preventing flow though the orifice, and an open position in which the control element is spaced away from the valve seat thereby permitting flow through the orifice;
wherein the cage includes an inner wall, an outer wall, and an intermediate wall disposed between the inner wall and the outer wall, the inner wall and the outer wall extending from the upper portion of the cage, the intermediate wall extending from the lower portion of the cage and comprising a base portion coupled to the lower portion of the cage and a terminal portion, a contiguous-annular surface of the intermediate wall extending from the lower portion of the cage on a first side of the intermediate wall, past the terminal portion, and to the base portion on a second side of the intermediate wall;
the inner wall including an inlet opening and the outer wall including an outlet opening; and
the inner wall, the outer wall, and the intermediate wall cooperating to define a portion of the flow passage, the portion of the flow passage extending from the inlet opening to the outlet opening,
wherein the portion of the flow passage further extends from the inlet opening, between the inner wall and the intermediate wall, past the terminal portion of the intermediate wall and between the terminal portion and the upper portion of the cage, between the intermediate wall and the outer wall, to the outlet opening,
wherein at least one of the inner wall and the outer wall includes a plurality of protrusions extending into the portion of the flow passage, and wherein the intermediate wall includes a plurality of protrusions extending into the portion of the flow passage.

2. The control valve of claim 1, wherein the plurality of protrusions cooperate to form a plurality of pressure drops along the portion of the flow passage.

3. The control valve of claim 1, wherein the plurality of protrusions carried by the at least one of the inner wall and the outer wall are vertically offset from the plurality of protrusions carried by the intermediate wall.

4. The control valve of claim 1, wherein a first pair of the protrusions and a second pair of the protrusions are vertically spaced by a substantially equal distance.

5. The control valve of claim 1, wherein the plurality of protrusions carried by the at least one of the inner wall and the outer wall overlap the plurality of protrusions carried by the intermediate wall.

6. The control valve of claim 1, wherein the outer wall, the inner wall, and the intermediate wall are substantially parallel to one another.

7. The control valve of claim 1, wherein the upper portion of the cage is coupled to the lower portion of the cage.

8. The control valve of claim 1, wherein the upper portion of the cage is coupled to the lower portion of the cage via at least one of threads or a fastener.

9. The control valve of claim 1, wherein the intermediate wall is disposed at an angle relative to a longitudinal axis of the control valve.

10. The control valve of claim 1, wherein a first pair of the protrusions are vertically spaced a first distance apart, and a second pair of the protrusions are vertically spaced a second distance apart, the second distance different from the first distance.

11. The control valve of claim 1, wherein the plurality of protrusions carried by the at least one of the inner wall and the outer wall are different lengths and the plurality of protrusions carried by the intermediate wall are different lengths.

12. The control valve of claim 1, wherein the protrusions of the at least one of the inner wall and the outer wall includes the inner wall including a plurality of radially outwardly extending protrusions and the outer wall including a plurality of radially inwardly extending protrusions, and wherein the protrusions of the intermediate wall includes the intermediate wall including a plurality of radially inwardly extending protrusions and radially outwardly extending protrusions.

13. The control valve of claim 12, wherein the radially inwardly extending protrusions of the intermediate wall are a different length than the radially outwardly extending protrusions of the intermediate wall.

14. The control valve of claim 12, wherein the radially outwardly extending protrusions of the inner wall are a different length than the radially inwardly extending protrusions of the outer wall.

15. The control valve of claim 12, wherein the intermediate wall is angled relative to at least one of the inner wall and the outer wall.

16. The control valve of claim 12, wherein portions of the plurality of protrusions carried by the inner wall are angled relative to at least one of the inner wall and the outer wall and portions of the plurality of protrusions carried by the intermediate wall are angled relative to at least one of the inner wall and the outer wall.

17. A cage for use with a control valve having an inlet, an outlet, and defining a flow passage between the inlet and the outlet, the cage comprising:

a generally cylindrical body and having a central bore, an upper portion, and a lower portion, the cage further includes an inner wall, an outer wall, and an intermediate wall disposed between the inner wall and the outer wall and comprising a base portion and a terminal portion, a contiguous-annular surface of the intermediate wall extending from the base portion on a first side of the intermediate wall, past the terminal portion, and to the base portion on a second side of the intermediate wall;

the inner wall including an inlet opening and the outer wall including an outlet opening; and the inner wall, the outer wall, and the intermediate wall cooperating to define a portion of the flow passage, the portion of the flow passage extending from the inlet opening to the outlet opening, wherein the portion of the flow passage further extends from the inlet opening, through the cage along the inner wall, along the intermediate wall, past the terminal portion of the intermediate wall and between the terminal portion and the upper portion of the cage or between the terminal portion and the lower portion of the cage, along the outer wall, to the outlet opening, wherein at least one of the inner wall and the outer wall includes a plurality of protrusions extending into the portion of the flow passage, and wherein the intermediate wall includes a plurality of protrusions extending into the portion of the flow passage.

18. The cage of claim 17, wherein the inner wall and the outer wall extend from the upper portion of the cage and the intermediate wall extends from the lower portion of the cage.

19. The cage of claim 17, further comprising an outer intermediate wall, the outer intermediate wall extending from the upper portion of the cage, wherein the portion of the flow passage further extends from the inlet opening, between the inner wall and the intermediate wall, past terminal portion of the intermediate wall, between the intermediate wall and the outer intermediate wall, past a terminal portion of the outer intermediate wall, between the outer intermediate wall and the outer wall, to the outlet opening.

20. The cage of claim 17, wherein the inner wall extends from the upper portion of the cage and the intermediate wall and the outer wall extends from the lower portion of the cage.

21. The cage of claim 17, further comprising a second intermediate wall and a third intermediate wall, the second intermediate wall extends from the upper portion of the cage and the third intermediate wall extends from the lower portion of the cage.

22. The cage of claim 17, further comprising a second intermediate wall and a third intermediate wall, the inner wall, the second intermediate wall, and the outer wall extending from the upper portion of the cage, the intermediate wall and the third intermediate wall extending from the lower portion of the cage, wherein the portion of the flow passage further extends from the inlet opening, between the inner wall and the intermediate wall, past the terminal portion of the intermediate wall, between the intermediate wall and the second intermediate wall, past a terminal portion of the second intermediate wall, between the second intermediate wall and the third intermediate wall, past a terminal portion of the third intermediate wall, between the third intermediate wall and the outer wall, to the outlet opening.

* * * * *

UNITED STATES PATENT AND TRADEMARK OFFICE
CERTIFICATE OF CORRECTION

PATENT NO. : 11,703,146 B2
APPLICATION NO. : 16/530802
DATED : July 18, 2023
INVENTOR(S) : Zhimin Sun et al.

It is certified that error appears in the above-identified patent and that said Letters Patent is hereby corrected as shown below:

In the Specification

At Column 1, Line 41, "though" should be -- through --.

At Column 2, Line 58, "off set." should be -- offset. --.

At Column 5, Line 42, "incudes" should be -- includes --.

At Column 6, Line 8, "spaced an" should be -- spaced at an --.

At Column 6, Line 12, "spaced an" should be -- spaced at an --.

At Column 6, Line 49, "frustrum" should be -- frustum --.

At Column 8, Line 65, "off-set" should be -- offset --.

At Column 9, Line 23, "relative a" should be -- relative to a --.

At Column 11, Line 15, "disclose cages" should be -- disclosed cages --.

At Column 11, Line 15, "[[600,]]" should be -- 600, --.

In the Claims

At Column 12, Line 25, "though" should be -- through --.

Signed and Sealed this
Third Day of December, 2024

Katherine Kelly Vidal
*Director of the United States Patent and Trademark Office*